US012725793B2

(12) United States Patent
Yi et al.

(10) Patent No.: US 12,725,793 B2
(45) Date of Patent: Sep. 1, 2026

(54) COMPOSITE NEGATIVE ELECTRODE MATERIAL AND APPLICATION THEREOF

(71) Applicant: Ningde Amperex Technology Limited, Ningde (CN)

(72) Inventors: Ting Yi, Ningde (CN); Zhihuan Chen, Ningde (CN); Hang Cui, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 880 days.

(21) Appl. No.: 17/974,775

(22) Filed: Oct. 27, 2022

(65) Prior Publication Data

US 2023/0062442 A1 Mar. 2, 2023

Related U.S. Application Data

(63) Continuation of application No. PCT/CN2020/087168, filed on Apr. 27, 2020.

(51) Int. Cl.

| | |
|---|---|
| ***H01M 4/38*** | (2006.01) |
| ***H01M 4/36*** | (2006.01) |
| *H01M 4/02* | (2006.01) |

(52) U.S. Cl.

CPC ........... *H01M 4/386* (2013.01); *H01M 4/362* (2013.01); *H01M 2004/021* (2013.01); *H01M 2004/027* (2013.01)

(58) Field of Classification Search

None

See application file for complete search history.

(56) References Cited

U.S. PATENT DOCUMENTS

2016/0036045 A1 2/2016 Burshtain et al.
2018/0342757 A1* 11/2018 Choi .................... H01M 4/386

FOREIGN PATENT DOCUMENTS

| | | | |
|---|---|---|---|
| CN | 1758466 | A | 4/2006 |
| CN | 102473907 | A | 5/2012 |
| CN | 103232040 | A | 8/2013 |
| CN | 102299338 | B | 6/2014 |
| CN | 106816594 | A | 6/2017 |
| CN | 107710465 | A | 2/2018 |

(Continued)

OTHER PUBLICATIONS

International Search Report mailed Jan. 27, 2021, in corresponding International Application No. PCT/CN2020/087168, 7 pages (with English Translation).

(Continued)

*Primary Examiner* — Zhongqing Wei
(74) *Attorney, Agent, or Firm* — Maier & Maier, PLLC

(57) ABSTRACT

A composite negative electrode material includes a Si-M-C composite material and graphene on a surface of the Si-M-C composite material, where M includes at least one of boron, nitrogen, or oxygen. Solid state nuclear magnetic resonance testing of the Si-M-C composite material shows that chemical shifts of element silicon include −5 ppm±5 ppm, −35 ppm±5 ppm, −75 ppm±5 ppm, and −110 ppm±5 ppm, and a peak width at half height at −5 ppm±5 ppm satisfies 7 ppm<K<28 ppm. The composite negative electrode material and the negative electrode plate and electrochemical apparatus that use the composite negative electrode material have good cycling performance.

16 Claims, 2 Drawing Sheets

(56) References Cited

FOREIGN PATENT DOCUMENTS

| | | | |
|---|---|---|---|
| CN | 108736006 | A | 11/2018 |
| CN | 109873133 | A | 6/2019 |
| CN | 109920987 | A | 6/2019 |
| CN | 110635119 | A | 12/2019 |
| CN | 110911636 | A | 3/2020 |
| JP | 103078092 | A | 5/2013 |
| JP | 2014-096321 | A | 5/2014 |
| JP | 2015160761 | A | 9/2015 |
| TW | 201929300 | A | 7/2019 |
| WO | 2011013855 | A1 | 2/2011 |

OTHER PUBLICATIONS

Decision of Refusal issued on Sep. 30, 2025, in corresponding Chinese Application No. 202010343613.0, 14 pages.
Office Action issued on Jan. 16, 2025, in corresponding Chinese Application No. 202010343613.0, 22 pages.
Office Action issued on Jul. 18, 2025, in corresponding Chinese Application No. 202010343613.0, 16 pages.
Office Action issued on Oct. 10, 2023, in corresponding Japanese Application No. 2022-562542, 6 pages.
Idrees et al., "Polyborosilazane Derived Ceramics—Nitrogen Sulfur Dual Doped Graphene Nanocomposite Node for Enhanced Lithium Ion Batteries", Electrochimica Acta, Elsevier Ltd., Nov. 17, 2018, vol. 296, pp. 925-937.

* cited by examiner

COMPOSITE NEGATIVE ELECTRODE MATERIAL AND APPLICATION THEREOF

CROSS REFERENCES TO RELATED APPLICATIONS

The present application is a Bypass Continuation Application of PCT application PCT/CN2020/087168, filed on Apr. 27, 2020, the disclosure of which is hereby incorporated by reference in its entirety.

TECHNICAL FIELD

This application relates to the field of lithium-ion battery technologies, and specifically, to a composite negative electrode material and application thereof.

BACKGROUND

Lithium-ion batteries are widely used in the field of consumer electronics by virtue of their advantages such as high specific energy, high working voltage, low self-discharge rate, small size, and light weight. With the rapid development of electric vehicles and mobile electronic devices, people have increasingly high requirements for the energy density, safety, and cycling performance of lithium-ion batteries. With a high theoretical gram capacity (4,200 mAh/g), silicon materials have a wide application prospect in lithium-ion batteries. During intercalation and deintercalation of lithium ions, the volume of a silicon-based material increases by 120% to 300%, causing the silicon-based material to be powdered and separated from a current collector. This will degrade the cycling performance of lithium-ion batteries and hinder further application of the silicon-based negative electrode material.

Main methods for resolving the problem of increased volume of silicon-based materials during cycling include designing porous silicon-based materials, reducing the size of silicon-based materials, and the like. The methods of designing porous silicon-based materials and reducing the size of silicon-based materials can mitigate swelling to some extent. However, as cycling continues, side reactions and uncontrollable production of SEI (Solid electrolyte interphase, solid electrolyte interphase) films further limit the cycling stability of silicon-based negative electrode materials.

Therefore, there is an urgent need for a silicon-based negative electrode material that can further improve the cycling stability of lithium-ion batteries and reduce volume swelling of lithium-ion batteries.

SUMMARY

This application is intended to provide a silicon-based composite negative electrode material and application thereof, to at least improve the cycling stability of lithium-ion batteries and reduce volume swelling of lithium-ion batteries.

A first aspect of this application provides a composite negative electrode material, including a Si-M-C composite material and graphene on a surface of the Si-M-C composite material, where M includes at least one of boron, nitrogen, or oxygen, solid state nuclear magnetic resonance testing of the Si-M-C composite material shows that chemical shifts of element silicon include −5 ppm±5 ppm, −35 ppm±5 ppm, −75 ppm±5 ppm, and −110 ppm±5 ppm, and a peak width at half height K at −5 ppm±5 ppm satisfies 7 ppm<K<28 ppm.

In some embodiments of the first aspect of this application, mass of the graphene accounts for 1% to 20% of mass of the composite negative electrode material.

In some embodiments of the first aspect of this application, $D_v50$ of the Si-M-C composite material is 3.0 μm to 8.0 μm.

In some embodiments of the first aspect of this application, $D_v50$ of the composite negative electrode material is 6.0 μm to 15.0 μm.

In some embodiments of the first aspect of this application, a peak intensity ratio of the composite negative electrode material satisfies $0<I_{1350}/I_{1580}<1$ in Raman testing.

In some embodiments of the first aspect of this application, a specific surface area of the composite negative electrode material is 0.5 $m^2/g$ to 8 $m^2/g$.

In some embodiments of the first aspect of this application, conductivity of the composite negative electrode material is 2.0 S/cm to 30 S/cm.

A second aspect of this application provides a negative electrode plate, including a mixture layer, where the mixture layer includes the composite negative electrode material according to the first aspect of this application.

In some embodiments of the second aspect of this application, resistance of the mixture layer is 0.02Ω to 0.1Ω.

A third aspect of this application provides an electrochemical apparatus, including the negative electrode plate according to the second aspect of this application.

A fourth aspect of this application provides an electronic apparatus, including the electrochemical apparatus according to the third aspect of this application.

In the composite negative electrode material according to this application, the Si-M-C composite material has a low swelling rate and graphene is present on the surface of the Si-M-C composite material, which improves conductivity of the composite negative electrode material and allows negative electrode plates and electrochemical apparatuses that use the composite negative electrode material to have good cycling performance.

The term "$D_v50$" as used herein indicates a particle size at 50% cumulative volume distribution, where particles whose size is less than that particle size have a cumulative volume accounting for 50% of the total volume of all particles. The particle size is determined using a laser particle size analyzer.

BRIEF DESCRIPTION OF DRAWINGS

To describe the technical solutions in the embodiments of this application and in the prior art more clearly, the following briefly describes the accompanying drawings for describing the embodiments and the prior art. Apparently, the accompanying drawings in the following description show merely some embodiments of this application, and a person of ordinary skill in the art may still derive other drawings from these accompanying drawings without creative efforts.

DETAILED DESCRIPTION

Figure 1:
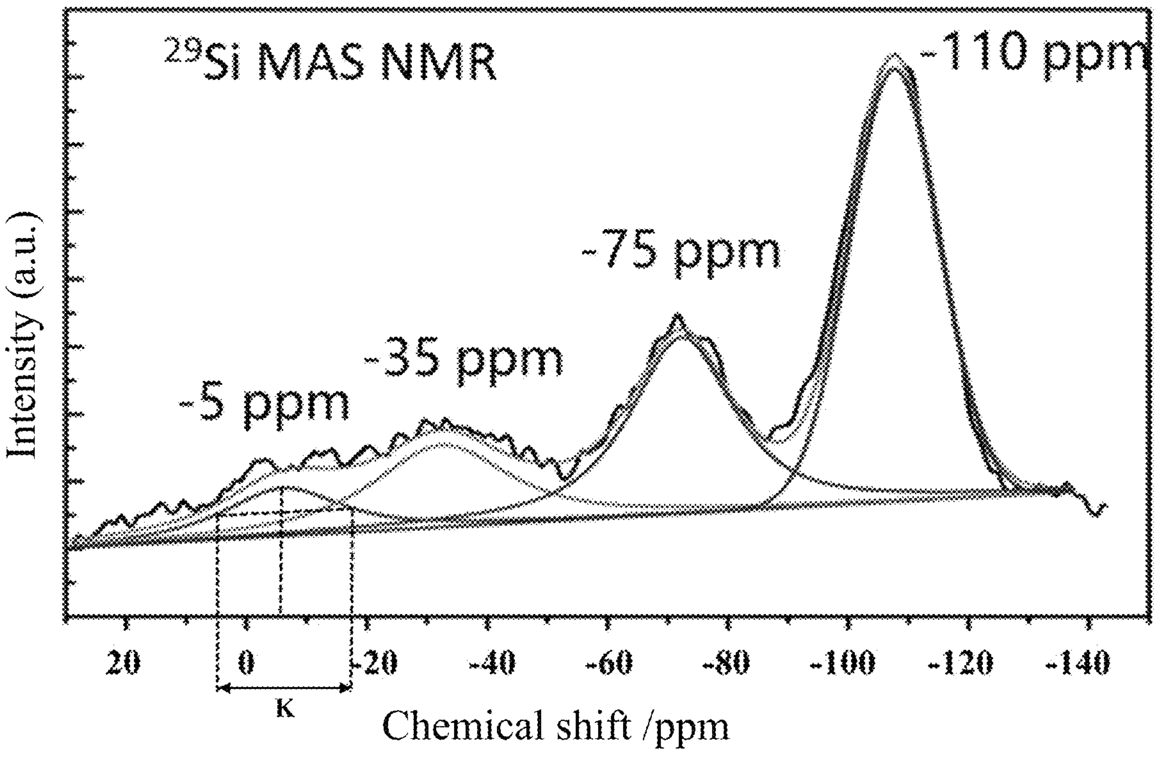
FIG. 1 shows a solid state nuclear magnetic resonance spectrum of a Si-M-C composite material in Example 7.

To make the objectives, technical solutions, and advantages of this application more comprehensible, the following describes this application in detail with reference to embodiments and accompanying drawings. Apparently, the described embodiments are merely some but not all of the embodiments of this application. All other embodiments obtained by a person of ordinary skill in the art based on the embodiments of this application without creative efforts shall fall within the protection scope of this application.

A first aspect of this application provides a composite negative electrode material, including a Si-M-C composite material and graphene on a surface of the Si-M-C composite material, where M includes at least one of boron, nitrogen, or oxygen, solid state nuclear magnetic resonance testing of the Si-M-C composite material shows that chemical shifts of element silicon include −5 ppm±5 ppm, −35 ppm±5 ppm, −75 ppm±5 ppm, and −110 ppm±5 ppm, and a peak width at half height K at −5 ppm±5 ppm satisfies 7 ppm<K<28 ppm.

During research, the inventors of this application unexpectedly find that as compared with some existing composite carbon-silicon-oxygen materials, the silicon element of the Si-M-C composite material in this application has a chemical shift that includes −5 ppm±5 ppm in solid state nuclear magnetic resonance testing. More unexpectedly, the inventors find that when the peak width at half height K at −5 ppm±5 ppm satisfies 7 ppm<K<28 ppm, the Si-M-C composite material has a lower swelling rate.

In addition, the "Si-M-C composite material and graphene on a surface of the Si-M-C composite material" in this application may be understood as that the graphene is present on part of the surface of the Si-M-C composite material, or the graphene is present on the entire surface of the Si-M-C composite material. This is not specifically limited in this application.

In some embodiments of the first aspect of this application, mass of the graphene accounts for 1% to 20% of mass of the composite negative electrode material.

In the research, the inventors also find that presence of the graphene can increase conductivity of the composite negative electrode material and improve electrical performance thereof. However, as the graphene content increases, first cycle efficiency of full cells decreases and swelling increases. Without wishing to be bound by any theory, this may be because the presence of the grapheme increases a specific surface area of the composite negative electrode material, which causes a larger area of contact with an electrolyte, forms more solid electrolyte interphase (SEI), and produces more byproducts. In addition, the improved conductivity increases a lithium intercalation depth, increasing cycling swelling. The inventors find that when mass of graphene accounts for 1% to 20% of mass of the composite negative electrode material, the composite negative electrode material can retain high cycling performance and a low swelling rate.

In some embodiments of the first aspect of this application, $D_v50$ of the Si-M-C composite material is 3.0 μm to 8.0 μm.

In some embodiments of the first aspect of this application, $D_v50$ of the composite negative electrode material is 6.0 μm to 15.0 μm.

Without wishing to be bound by any theory, the inventors find that an excessively small particle size of the composite negative electrode material results in a large specific surface area and a large area of contact with the electrolyte, many-lithium sources consumed, and low first cycle efficiency. An excessively large particle size thereof causes excessively large local swelling of the negative electrode during cycling and affects cycling stability.

In some embodiments of the first aspect of this application, a peak intensity ratio of the composite negative electrode material satisfies $0<I_{1350}/I_{1580}<1$ in Raman testing.

$I_{1350}$ represents carbon defects in the material. A larger $I_{1350}/I_{1580}$ value indicates more surface defects in the Si-M-C composite material, more factors hindering free electron flow, higher resistance, and lower conductivity.

In some embodiments of the first aspect of this application, a specific surface area of the composite negative electrode material is 0.5 $m^2/g$ to 8 $m^2/g$.

In some embodiments of the first aspect of this application, conductivity of the composite negative electrode material is 2.0 S/cm to 30 S/cm.

The composite negative electrode material in this application may be prepared in the following method:

(1) Dissolve a carbon source in an organic solvent and add organic silicon after the carbon source is fully dissolved. Stir the mixture for 3 to 5 hours so that the carbon source solution is fully mixed with the organic silicon. Then, heat and stir the mixture to remove the organic solvent and dry the resulting product. A mass-to-volume ratio of the carbon source and organic solvent is 0.01 g/ml to 0.1 g/ml, preferentially 0.05 g/ml. A mass ratio of the carbon source to the organic silicon is 1:(2−0.5).

(2) Crack the product obtained in step (1) at a high temperature of 900° C. to 1500° C. under the protection of inert gas to obtain a Si-M-C composite material.

(3) Mix the Si-M-C composite material with a graphene slurry and stir the mixture to obtain a mixed slurry. A mass ratio of the Si-M-C composite material to the graphene is (4−99):1.

(4) Spray dry the mixed slurry for granulation.

In step (1), the carbon source may be selected from at least one of glucose or sucrose. The organic solvent may be selected from an organic solvent commonly used in the art, which is not limited in this application. For example, the organic solvent may be selected from at least one of xylene, acetone, cyclohexane, or triethylamine. The organic silicon may be selected from one or more of polysiloxane, polysilazane, carborane methyl silicone, and polysilicoborazane.

Heating and stirring in step (1) are a technical means commonly used in the art to remove the organic solvent. For example, stirring may be performed at 60° C. to 100° C., which is not limited in this application.

Drying in step (1) is a technical means commonly used in the art. For example, drying may be performed in a drying oven at 60° C. to 100° C. for 20 to 30 hours, which is not limited in this application.

The inert gas in step (2) may be selected from nitrogen or argon and is protective gas commonly used in the art, which is not limited in this application.

In step (2), cracking is performed at a high temperature of 900° C. to 1500° C. Specifically, a reaction condition may be as follows: Increase the temperature at a speed of 1° C./min to 500° C., maintain the temperature for 30 min, and then increase the temperature at a speed of 3° C./min to 900° C. to 1500° C., and maintain the temperature for 3 h.

In the research, the inventors unexpectedly find that temperature affects performance of the Si-M-C composite material in cracking reactions. When the temperature is <900° C. and $I_{1350}/I_{1580}$ is >1, the Si-M-C composite material has many defects on its surface, causing a low first cycle coulombic efficiency, poor cycling performance, and increased cycling swelling of full cells.

In step (4), before the spray drying granulation, deionized water may be added to the mixed slurry to adjust viscosity and a solid content of the mixed slurry.

A spray drying granulation device is not limited in this application, as long as the objectives of this application can be achieved. For example, the small-sized spray dryer QM-1500-A from Shanghai Oumeng or the ultra-large spray dryer from Wuxi Fuchao may be used.

A second aspect of this application provides a negative electrode plate, including a mixture layer, where the mixture layer includes the composite negative electrode material according to the first aspect of this application.

In some embodiments of the second aspect of this application, the negative electrode plate may further include a current collector, and the mixture layer may be applied on one or two surfaces of the current collector. A person skilled in the art may make a selection based on an actual need, and this is not limited in this application.

The current collector is not specifically limited, and any current collector well known to those skilled in the art may be used. Specifically, for example, a current collector made of at least one of iron, copper, aluminum, nickel, stainless steel, titanium, tantalum, gold, platinum, and the like may be used. For a negative electrode current collector, copper foil or copper alloy foil is particularly preferred. One of the preceding materials may be used alone or two or more thereof may be combined at any proportion for use.

In some embodiments of this application, the mixture layer further includes graphite, where the graphite may be selected from one or more of natural graphite, artificial graphite, meso-carbon microbeads, and the like. In some embodiments of this application, a mixture of the composite negative electrode material in this application and graphite is used as a negative electrode active material.

In some embodiments of this application, the mixture layer may further include a binder. The binder is not specifically limited, and may be any binder well known to those skilled in the art or a combination thereof. For example, at least one of polyacrylate, polyimide, polyamide, polyamideimide, polyvinylidene fluoride, styrene butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, potassium hydroxymethyl cellulose, and the like may be used. One of these binders may be used alone or two or more may be combined at any proportion for use.

In some embodiments of this application, the mixture layer may further include a conductive agent. The conductive agent is not specifically limited, and may be any conductive agent well known to those skilled in the art or a combination thereof. For example, at least one of zero-dimensional conductive agent, one-dimensional conductive agent, and two-dimensional conductive agent may be used. Preferentially, the conductive agent may include at least one of carbon black, conductive graphite, carbon fiber, carbon nanotube, VGCF (vapor growth carbon fiber), or graphene. An amount of the conductive agent is not specifically limited, and may be selected based on knowledge commonly known in the art. One of these conductive agents may be used alone or two or more may be combined at any proportion for use.

In some embodiments of the second aspect of this application, resistance of the mixture layer is 0.02Ω to 0.1Ω.

A third aspect of this application provides an electrochemical apparatus, including the negative electrode plate according to the second aspect of this application.

The electrochemical apparatus in this application includes but is not limited to all types of primary batteries, secondary batteries, fuel batteries, and solar batteries or capacitors. A typical electrochemical apparatus is a lithium-ion battery, which is a secondary battery. The electrochemical apparatus, for example, the lithium-ion battery, usually includes a negative electrode plate, a positive electrode plate, a separator, and an electrolyte.

Further, the electrochemical apparatus may be the lithium-ion battery provided in this application.

The electrochemical apparatus provided in this application uses the negative electrode plate provided in this application. Other components, including a positive electrode plate, separator, and electrolyte, are not specifically limited. For example, a positive electrode material of the positive electrode plate may include but is not limited to lithium cobaltate, lithium manganate, lithium iron phosphate, or the like. A material of the separator may include but is not limited to glass fiber, polyester, polyethylene, polypropylene, polytetrafluoroethylene, or a combination thereof. The electrolyte typically includes an organic solvent, lithium salt, and additive. The organic solvent may include but is not limited to at least one of ethylene carbonate (EC), propylene carbonate (PC), diethyl carbonate (DEC), ethyl methyl carbonate (EMC), dimethyl carbonate (DMC), propylene carbonate, and ethyl propionate. The lithium salt may include at least one of organic lithium salt or inorganic lithium salt. For example, the lithium salt may include at least one of lithium hexafluorophosphate ($LiPF_6$), lithium tetrafluoroborate ($LiBF_4$), lithium difluorophosphate ($LiPO_2F_2$), lithium lithium bis(trifluoromethanesulfonyl) imid $LiN(CF_3SO_2)_2$ (LiTFSI), lithium bis(fluorosulfonyl) imide $Li(N(SO_2F)_2)$ (LiFSI), lithium difluoro(oxalato)borate $LiB(C_2O_4)_2$ (LiBOB), and lithium difluoro(oxalato) borate $LiBF_2(C_2O_4)$ (LiDFOB).

A preparation process of the electrochemical apparatus is a common sense for a person skilled in the art, and is not particularly limited in this application. For example, the secondary battery may be manufactured in the following process: a positive electrode and a negative electrode are stacked with a separator therebetween, and the stack is put into a battery container after operations such as winding and folding as needed. The battery container is injected with a liquid electrolyte and then sealed. The negative electrode used is the foregoing negative electrode plate provided in this application. In addition, an over-current protection element, a guide, or the like may also be placed into the battery container as needed, so as to prevent pressure inside the battery from rising and the battery from over-charging and over-discharging.

A fourth aspect of this application provides an electronic apparatus, including the electrochemical apparatus according to the third aspect of this application.

Below, this application will be specifically described with examples, but this application is not limited to these examples.

Solid State Nuclear Magnetic Resonance:

A $^{29}Si$ solid state nuclear magnetic resonance spectral test was performed by using an AVANCE III 400 WB spectrometer (wide cavity), with a spinning speed of 8 kHz for $^{29}Si$. FIG. 1 is a solid state nuclear magnetic resonance spectrum of a Si-M-C composite material in Example 7.

Raman Test:

The Jobin Yvon LabRAM HR spectrometer was used, with an excitation light source of 532 nm, a scanning wavenumber ranging from 0 $cm^{-1}$ to 4000 $cm^{-1}$, and an area of a test sample of 100 μm×100 μm. A final $I_{1350}/I_{1580}$ value was obtained by collecting statistics on 100 $I_{1350}/I_{1580}$ values.

Particle Size Test:

About 0.02 g powder of each sample was added into a 50 ml clean beaker, about 20 ml deionized water was added, and then several drops of 1% surfactant was added, so that the powder was fully dispersed in water. The mixture was subjected to ultrasonic processing for 5 minutes in a 120 W ultrasonic cleaner, and then MasterSizer 2000 was used to test particle size distribution.

Specific Surface Area Test of Composite Material:

After an adsorption amount of gas on a surface of the solid material under different relative pressures was tested at a constant low temperature, a monolayer adsorption amount of the sample was calculated based on the Brunauer-Emmett-Teller theory and formula (BET formula). Then a specific surface area of the solid material was calculated.

Powder Conductivity Test of Composite Material:

5 g of a composite negative electrode material powder sample was taken and pressed by using an electronic press at a pressure of 5000 kg±2 kg for 15 s to 25 s. The sample was placed between electrodes of a resistivity tester (ST-2255A of Suzhou Jingge Electronic Co., Ltd.), with the height of the sample set to h (cm), a voltage cross both ends set to U, a current set to I, and resistance set to R (KΩ). A surface area of the powder pressed was S=3.14 $cm^2$. Electronic conductivity (S/cm) of the powder was calculated by using the following formula: $\delta=h/(S\times R)/1000$.

Sheet Resistance Test of Negative Electrode:

A four-probe method was used to test a resistance of a negative electrode mixture layer. A precision direct-current voltage and current source (SB118) was used in the four-probe test. Four 1.5 cm (length)×1 cm (width)×2 mm (thickness) copper plates were fixed on the same line with an equal spacing. A distance between the middle two copper plates was L (1-2 cm) and a substrate for fixing the copper plates was an insulating material. During testing, lower end surfaces of the four copper plates were pressed to the negative electrode mixture layer (at a pressure of 3000 Kg) for 60 s. A direct-current current I was connected to copper plates on the two ends and a voltage V of the two middle copper plates was measured. The I and V values were read three times, and average values of I and V, Ia and Va, were obtained. A value of Va/Ia was a resistance of a point of the mixture layer under test. For each electrode plate, 12 points were taken for testing and an average value was obtained.

SEM Test:

Scanning electron microscopy characterization was recorded by a PhilipsXL-30 field emission scanning electron microscope. The test was performed at 10 kV and 10 mA.

Specific Capacity Test of Composite Negative Electrode Material:

A composite negative electrode material obtained in an example or a comparative example was mixed with conductive carbon black and a binder PAA at a mass ratio of 80:10:10, deionized water was added, and the mixture was stirred to prepare a slurry with a solid content of 30%. A slurry with a mass of M was applied to a copper foil. The resulting copper foil was dried in a vacuum drying oven for 12 hours at 85° C., and then was cut into a wafer with a diameter of 1.4 cm in a dry environment by using a punching machine. A lithium metal plate was used as a counter electrode in a glove box, a Ceglard composite membrane was selected as a separator, and an electrolyte was added to assemble a button battery. The LAND (LAND) battery test system was used to perform a charge and discharge test for the battery to test its charge and discharge performance. A capacity of C (mAh) was obtained. Then, a capacity per gram of the composite negative electrode material was C/(M×30%×80%).

Full Cell Performance Test:

First cycle efficiency test of full cell: In the first charge and discharge cycle of the full cell, the full cell was charged at a constant current of 0.5 C to 4.45 V, then charged at a constant voltage of 4.45 V to 0.025 C (to obtain a capacity of C0), left standing for 5 min, and then discharged to 3.0 V at 0.5 C (to obtain a discharge capacity of D0). First cycle efficiency of the full cell=D0/C0.

Figure 2:
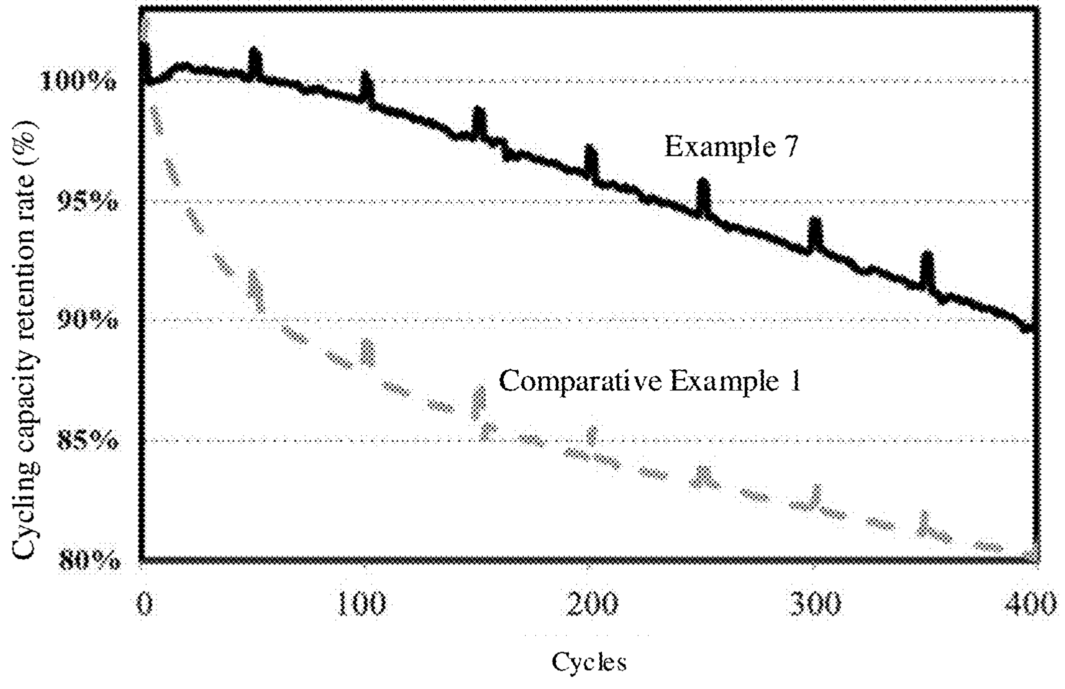
FIG. 2 shows capacity attenuation curves of Example 7 and Comparative Example 1.

Cycling Test:

The test was performed at a temperature of 45° C. The battery was charged at a constant current of 0.5 C to 4.45 V, charged at a constant voltage to 0.025 C, left standing for 5 min, and then discharged to 3.0 V at 0.5 C. A capacity obtained was an initial capacity. A 0.5 C charge/0.5 C discharge cycling test was performed. A capacity obtained in each cycle was compared with the initial capacity to obtain a capacity attenuation curve. Capacity attenuation curves of Example 7 and Comparative Example 1 are shown in FIG. 2. Capacity retention rates of the examples and comparative examples after 400 cycles are shown in Table 1 and Table 2.

Swelling Rate Test of Fully Charged Lithium-Ion Battery:

A spiral micrometer was used to measure thickness of an initially half-charged lithium-ion battery. The battery was charged and discharged for 400 times at 45° C. When the lithium-ion battery was fully charged, the spiral micrometer was used to measure thickness of the battery. The thickness was compared with the thickness of the initially half-charged lithium-ion battery to obtain a swelling rate of the fully charged lithium-ion battery.

Preparation of Full Cell:

Preparation of Negative Electrode Plate:

The composite negative electrode material prepared in an example or comparative example was mixed with graphite at a specific ratio to obtain negative electrode active material powder with a designed mixed capacity per gram of 500 mAh/g. The negative electrode active material powder, a conductive agent acetylene black, and PAA were added at a weight ratio of 95:1.2:3.8 in a deionized water solvent system and fully stirred and uniformly mixed. The resulting mixture was applied on two surfaces of a 10 μm thick current collector copper foil with a coating thickness of 100 μm. The plate was dried and cold pressed with compacted density of 1.8 $g/cm^3$ for the two surfaces to obtain a negative electrode plate.

Preparation of Positive Electrode Plate:

Active substance $LiCoO_2$, conductive carbon black, a binder polyvinylidene fluoride (PVDF) were added at a weight ratio of 96.7:1.7:1.6 in a N-methylpyrrolidone solvent system to prepare a slurry with a solid content of 0.75. The slurry was stirred well. The resulting slurry was uniformly applied on one surface of a 12 μm thick positive electrode current collector aluminum foil with a coating thickness of 115 μm. The aluminum foil was dried at 90° C. and cold pressed to obtain a positive electrode plate.

Assembling of Full Cell:

A 15 μm thick PE porous polymer film was used as a separator. The positive electrode plate, the separator, and the negative electrode plate were stacked in sequence so that the separator was sandwiched between the anode and cathode for isolation, and the stack was wound to obtain an electrode assembly. The electrode assembly was placed in the outer package, the prepared electrolyte (EC:DMC:DEC=1:1:1 vol %, 10 wt % FEC, 1 mol/L $LiPF_6$) was injected and the package was sealed, followed by processes such as formation, degassing, and cutting to obtain a full cell.

Preparation of Composite Negative Electrode Material

Example 1

10 g of glucose was fully dissolved in a 200 mL xylene solvent, 20 g of polydimethylsiloxane (with a monomer of $C_2H_6OSi$) was added, and the resulting product was stirred for 4 h so that the glucose solution and polydimethylsiloxane were fully mixed. The mixture was stirred and heated at 80° C. to remove the solvent, and dried in a drying oven for 24 h at 80° C. The resulting product was cracked at a high temperature in a tubular furnace at 900° C. with $N_2$ as the protective gas. A heating process is as follows: Heating was performed at 1° C./min to 500° C. and kept for 30 min, and further at 3° C./min to 900° C. and kept for 3 h, to obtain a composite Si-M-C material.

10 g of the composite Si-M-C material and 1.01 g of graphene slurry with a solid content of 10% were added into a MSK-SFM-10 vacuum mixer for mixing at a revolution speed of 10 to 40 rpm. After 180 minutes, 100 mL deionized water was added for mixing at a revolution speed of 10 to 40 rpm and a rotation speed of 1000 to 1500 rpm for 120 min to obtain a mixed slurry.

The mixed slurry was transferred to the centrifugal rotary nozzle of the spray drying granulator at a centrifugal speed of 2000 rpm to form minute droplets. An inlet temperature of the spray drying granulator was 260° C. and an outlet temperature thereof was 105° C. Powder was cooled and collected to obtain a composite negative electrode material with graphene on the surface, where a graphene content was 1%.

Example 2

Example 2 was the same as Example 1 except that polydimethylsiloxane was replaced with hexamethylcyclotrisilazane (with a monomer of $C_6H_{21}N_3Si_3$) to prepare a composite negative electrode material that included a composite Si-M-C material.

Example 3

Example 3 was the same as Example 1 except that polydimethylsiloxane was replaced with carborane methyl silicone (with a monomer of $C_{10}H_{34}B_{10}Si_4$) to prepare a composite negative electrode material that included a composite Si-M-C material.

Example 4

Example 4 was the same as Example 1 except that a cracking temperature was 1100° C.

Example 5

Example 5 was the same as Example 1 except that a cracking temperature was 1300° C.

Example 6

Example 6 was the same as Example 1 except that a cracking temperature was 1500° C.

Example 7

Example 7 was the same as Example 4 except that mass of the graphene slurry was 5.26 g so as to obtain a composite negative electrode material with a graphene content of 5%.

Example 8

Example 8 was the same as Example 4 except that mass of the graphene slurry was 11.11 g so as to obtain a composite negative electrode material with a graphene content of 10%.

Example 9

Example 9 was the same as Example 4 except that mass of the graphene slurry was 17.65 g so as to obtain a composite negative electrode material with a graphene content of 15%.

Example 10

Example 10 was the same as Example 4 except that mass of the graphene slurry was 25 g so as to obtain a composite negative electrode material with a graphene content of 20%.

Example 11

Example 11 was the same as Example 7 except that a centrifugal speed for spray drying granulation was 6000 rpm.

Example 12

Example 12 was the same as Example 7 except that a centrifugal speed for spray drying granulation was 5000 rpm.

Example 13

Example 13 was the same as Example 7 except that a centrifugal speed for spray drying granulation was 3000 rpm.

Example 14

Example 14 was the same as Example 7 except that a centrifugal speed for spray drying granulation was 500 rpm.

Example 15

Example 15 was the same as Example 7 except that a centrifugal speed for spray drying granulation was 200 rpm.

Example 16

Example 16 was the same as Example 7 except that an amount of glucose used was changed to 20 g.

Example 17

Example 17 was the same as Example 16 except that an amount of polydimethylsiloxane used was changed to 10 g.

Example 18

Example 17 was the same as Example 7 except that 10 g of polydimethylsiloxane and 10 g of carborane methyl silicone were added to the glucose and xylene solvent to prepare a composite negative electrode material that included a composite Si—B—O—C material.

Comparative Example 1

Comparative Example 1 was the same as Example 7 except that the composite Si—O—C material prepared in Example 7 was not granulated with graphene but was directly used as a composite negative electrode material to prepare a negative electrode plate.

Comparative Example 2

Comparative Example 2 was the same as Example 1 except that the cracking temperature was 600° C.

Comparative Example 3

Comparative Example 3 was the same as Example 1 except that the cracking temperature was 1800° C.

Comparative Example 4

Comparative Example 4 was the same as Example 4 except that mass of the graphene slurry was 42.86 g so as to obtain a composite negative electrode material with a graphene content of 30%.

Comparative Example 5

10 g of the composite Si—O—C material prepared in Example 4 was added to 100 mL deionized water and mixed at a revolution speed of 10 to 40 rpm and a rotation speed of 1000 to 1500 rpm for 120 min to obtain a mixed slurry.

The mixed slurry was transferred to the centrifugal rotary nozzle of the spray drying granulator at a centrifugal speed of 2000 rpm to form minute droplets. An inlet temperature of the spray drying granulator was 260° C. and an outlet temperature thereof was 105° C. Powder was cooled and collected to obtain a composite negative electrode material with no graphene on the surface.

The composite negative electrode material was mixed with graphite at a given ratio to obtain negative electrode active material powder with a designed mixed capacity per gram of 500 mAh/g. The negative electrode active material powder, a conductive agent acetylene black, and PAA were added in a deionized water solvent system at a weight ratio of 95:1.2:3.8 and stirred for 30 minutes. The graphene slurry was added so that mass of graphene accounted for 5% of a total mass of the negative electrode active material powder, conductive agent acetylene black, and PAA. Deionized water was added and the mixture was stirred to a kneading state. The resulting mixture was applied on two surfaces of a 10 μm thick current collector copper foil with a coating thickness of 100 μm. The plate was dried and cold pressed so that the compacted density of the two surfaces was 1.8 g/cm$^3$, thus to obtain a negative electrode plate.

The parameters and test results of the examples are given in Table 1. The parameters and test results of the comparative examples are given in Table 2.

TABLE 1

| Example | Organosilane monomer | Mass ratio of carbon source to organic silicon | Cracking temperature (° C.) | Centrifugal speed (r/min) | Graphene content (%) | $D_v50$ of Si—M—C composite material (μm) | $D_v50$ of composite negative electrode material (μm) | Specific surface area |
|---|---|---|---|---|---|---|---|---|
| 1 | $C_2H_6OSi$ | 1:2 | 900 | 2000 | 1% | 5.0 | 6.5 | 2.51 |
| 2 | $C_6H_{21}N_3Si_3$ | 1:2 | 900 | 2000 | 1% | 5.5 | 7.0 | 2.31 |
| 3 | $C_{10}H_{34}B_{10}Si_4$ | 1:2 | 900 | 2000 | 1% | 6.5 | 7.4 | 2.12 |
| 4 | $C_2H_6OSi$ | 1:2 | 1100 | 2000 | 1% | 5.3 | 6.8 | 2.43 |
| 5 | $C_2H_6OSi$ | 1:2 | 1300 | 2000 | 1% | 6.0 | 7.2 | 2.20 |
| 6 | $C_2H_6OSi$ | 1:2 | 1500 | 2000 | 1% | 7.5 | 8.5 | 1.70 |
| 7 | $C_2H_6OSi$ | 1:2 | 1100 | 2000 | 5% | 5.3 | 8.9 | 3.13 |
| 8 | $C_2H_6OSi$ | 1:2 | 1100 | 2000 | 10% | 5.3 | 9.3 | 3.59 |
| 9 | $C_2H_6OSi$ | 1:2 | 1100 | 2000 | 15% | 5.3 | 10.2 | 4.02 |
| 10 | $C_2H_6OSi$ | 1:2 | 1100 | 2000 | 20% | 5.3 | 13.1 | 4.86 |
| 11 | $C_2H_6OSi$ | 1:2 | 1100 | 6000 | 5% | 5.3 | 17.2 | 4.20 |
| 12 | $C_2H_6OSi$ | 1:2 | 1100 | 5000 | 5% | 5.3 | 14.5 | 2.91 |
| 13 | $C_2H_6OSi$ | 1:2 | 1100 | 3000 | 5% | 5.3 | 12.3 | 3.13 |
| 14 | $C_2H_6OSi$ | 1:2 | 1100 | 500 | 5% | 5.3 | 6.2 | 3.87 |
| 15 | $C_2H_6OSi$ | 1:2 | 1100 | 200 | 5% | 5.3 | 5.8 | 2.01 |
| 16 | $C_2H_6OSi$ | 1:1 | 1100 | 2000 | 5% | 5.0 | 8.5 | 3.21 |
| 17 | $C_2H_6OSi$ | 2:1 | 1100 | 2000 | 5% | 5.0 | 8.4 | 3.25 |
| 18 | $C_2H_6OSi$ + $C_{10}H_{34}B_{10}Si_4$ | 1:2 | 1100 | 2000 | 5% | 6.0 | 7.1 | 2.95 |

| Example | $I_{1350}/I_{1580}$ in Raman testing | Powder conductivity (S/cm) | Peak width at half height at −5 ppm ± 5 ppm in solid state nuclear magnetic resonance testing (ppm) | Sheet resistance (Ω) | First cycle coulombic efficiency of full cell (%) | Capacity retention rate after 400 cycles (%) | Battery swelling rate after 400 cycles (%) |
|---|---|---|---|---|---|---|---|
| 1 | 0.95 | 2.33 | 25 | 0.063 | 83.4 | 86.5 | 7.4 |
| 2 | 0.95 | 2.34 | 25 | 0.062 | 83.6 | 87.2 | 7.8 |
| 3 | 0.95 | 2.33 | 25 | 0.063 | 84.5 | 85.9 | 8.2 |
| 4 | 0.9 | 3.21 | 20 | 0.058 | 83.7 | 87.8 | 6.8 |
| 5 | 0.8 | 4.53 | 10 | 0.055 | 84.0 | 88.3 | 7.3 |
| 6 | 0.7 | 5.12 | 8 | 0.053 | 85.1 | 88.7 | 8.5 |
| 7 | 0.65 | 8.28 | 20 | 0.047 | 83.2 | 89.2 | 7.0 |

TABLE 1-continued

| | | | | | | | |
|---|---|---|---|---|---|---|---|
| 8 | 0.6 | 9.02 | 20 | 0.044 | 82.7 | 89.6 | 7.4 |
| 9 | 0.53 | 11.14 | 20 | 0.040 | 81.3 | 90.0 | 7.8 |
| 10 | 0.46 | 20.52 | 20 | 0.025 | 80.0 | 90.5 | 8.0 |
| 11 | 0.65 | 8.20 | 20 | 0.046 | 84.5 | 80.2 | 10.1 |
| 12 | 0.65 | 8.21 | 20 | 0.048 | 83.7 | 84.5 | 8.2 |
| 13 | 0.65 | 8.19 | 20 | 0.047 | 82.8 | 83.8 | 8.5 |
| 14 | 0.65 | 8.21 | 20 | 0.047 | 81.2 | 82.3 | 8.6 |
| 15 | 0.65 | 8.22 | 20 | 0.046 | 79.9 | 81.3 | 9.8 |
| 16 | 0.65 | 10.22 | 20 | 0.045 | 83.7 | 88.3 | 7.5 |
| 17 | 0.65 | 14.3 | 20 | 0.045 | 83.7 | 87.6 | 8.0 |
| 18 | 0.65 | 8.30 | 20 | 0.047 | 83.9 | 87.8 | 7.7 |

TABLE 2

| Comparative Example | Organosilane monomer | Mass ratio of carbon source to organic silicon | Cracking temperature (° C.) | Centrifugal speed (r/min) | Graphene content (%) | $D_v50$ of Si—M—C composite material (μm) | $D_v50$ of composite negative electrode material (μm) | Specific surface area |
|---|---|---|---|---|---|---|---|---|
| 1 | $C_2H_6OSi$ | 1:2 | 1100 | — | 0 | 5.3 | — | 3.64 |
| 2 | $C_2H_6OSi$ | 1:2 | 600 | 2000 | 1% | 2.8 | 4.2 | 4.52 |
| 3 | $C_2H_6OSi$ | 1:2 | 1800 | 2000 | 1% | 9.0 | 20.1 | 2.82 |
| 4 | $C_2H_6OSi$ | 1:2 | 1100 | 2000 | 30% | 5.3 | 17.3 | 8.09 |
| 5 | $C_2H_6OSi$ | 1:2 | 1100 | 2000 | 0 | 5.3 | 5.3 | 3.64 |

| Comparative Example | $I_{1350}/I_{1580}$ in Raman testing | Powder conductivity (S/cm) | Peak width at half height at −5 ppm ± 5 ppm in solid state nuclear magnetic resonance testing (ppm) | Sheet resistance (Ω) | Initial coulombic efficiency of full cell (%) | Capacity retention rate after 400 cycles (%) | Battery swelling rate after 400 cycles (%) |
|---|---|---|---|---|---|---|---|
| 1 | 2.0 | 0.03 | 20 | 0.132 | 80.1 | 76.3 | 5.8 |
| 2 | 1.2 | 1.40 | 30 | 0.091 | 78.7 | 76.3 | 9.8 |
| 3 | 0.33 | 6.32 | 5 | 0.052 | 83.9 | 79.9 | 10.1 |
| 4 | 0.3 | 32.38 | 20 | 0.015 | 77.0 | 80.1 | 10.5 |
| 5 | 2.0 | 0.03 | 20 | 0.08 | 81.1 | 82.6 | 9.4 |

A comparison between the examples and Comparative Example 1 shows that the composite negative electrode material with graphene on the surface has significantly improved conductivity, the corresponding plate mixture layer has reduced resistance, and the corresponding full cell has significantly improved cycling performance.

It can be seen from Examples 1, 2, and 3 that Si-M-C composite materials with different compositions made of different organic silane can have a high capacity retention rate and low swelling rate. Meanwhile, the inventors further find that the greater the molecular weight of the organic silicon monomer, the larger the particle size of the prepared Si-M-C composite material. Without wishing to be bound by any theory, the inventors find that when the particle size increases, the specific surface area decreases, the area of contact with the electrolyte during formation is smaller, less lithium sources are consumed, and the first cycle coulombic efficiency of the battery is improved.

It can be seen from a comparison between Examples 1, 4, 5, and 6 and Comparative Examples 2 and 3 that when a peak width at half height of the shift peak of element silicon at −5 ppm±5 ppm during solid state nuclear magnetic testing is 7 ppm to 28 ppm, the smaller the peak width at half height, the higher first cycle coulombic efficiency of the full cell and the higher the cycling capacity retention rate. In addition, the battery swelling rate gradually decreases while the peak width at half height increases, and when the peak width at half height reaches 20 ppm, the battery swelling rate increases while the peak width at half height increases. The inventors find that when the peak width at half height of the shift peak of element silicon at −5 ppm±5 ppm during solid state nuclear magnetic testing is 7 ppm to 28 ppm, the battery can have a high cycling capacity retention rate and coulombic efficiency and a low swelling rate.

In addition, it can further be seen from Examples 1, 4, 5, and 6 that a reaction cracking temperature affects the peak width at half height of a shift peak at −5 ppm±5 ppm. Without wishing to be bound by any theory, the processing temperature greatly affects crystallization of the material. The higher the temperature, the higher degree of crystallization of the material, and the smaller peak width at half height of a shift peak of $^{29}Si$ at −5 ppm±5 ppm during solid state nuclear magnetic testing. Oppositely, the lower the temperature, the lower degree of crystallization of the material, and the larger peak width at half height of a shift peak at −5 ppm±5 ppm. In addition, in Examples 1, 2, and 3, the processing temperature was 900° C. and the peak width at half heights at −5 ppm±5 ppm of the obtained Si-M-C composite material during solid state nuclear magnetic testing were the same.

In addition, with the same graphene content, the higher cracking temperature of the Si-M-C composite material, the smaller $I_{1350}/I_{1580}$ value of the resulting composite negative electrode material in Raman testing. $I_{1350}$ represents carbon defects in the material. When the temperature is <900° C. and $I_{1350}/I_{1580}$ is >1, the Si-M-C composite material has many defects on its surface. Without wishing to be bound by any theory, more surface defects in the material means more factors hindering free electron flow, higher resistance, lower conductivity of the material, lower first cycle coulombic efficiency and cycling performance of the full cell, more byproducts in reaction, and more cycling swelling.

It can be seen from a comparison between Examples 7 to 10 and Comparative Example 4 that as the graphene content increases, battery cycling swelling increases. Without wishing to be bound by any theory, this may be because a lithium intercalation depth increases due to improved conductivity. In addition, a larger specific surface area of graphene causes a larger area of contact with the electrolyte, produces more byproducts, and increases cycling swelling. Therefore, an amount of graphene shall be controlled at 1% to 20%.

It can be seen from Examples 11 to 15 that the greater the particle size of the composite negative electrode material, the higher the first cycle coulombic efficiency of the full cell. Without wishing to be bound by any theory, this may be because a smaller particle size causes a larger specific surface area of the material, a larger area of contact with the electrolyte, and more lithium sources consumed. Meanwhile, it can be seen that within a special range, the greater the particle size of the composite negative electrode material, the higher the capacity retention rate and the lower the swelling rate. However, when the particle size is greater than 15 μm, the capacity retention rate of the full cell decreases and swelling thereof increases. Without wishing to be bound by any theory, this may be because an excessively large particle size causes excessively large local swelling of the negative electrode during cycling, which affects cycling stability. Therefore, in some preferred embodiments of this application, the particle size of the composite negative electrode material is 6 μm to 15 μm.

It can be seen from a comparison between Example 7 and Comparative Example 5 that as compared with directly adding graphene to the negative electrode active material slurry, the composite negative electrode material obtained through composite granulation of graphene and the Si-M-C composite material ensures lower sheet resistance and better cycling and swelling performance for the negative electrode plate. Without wishing to be bound by any theory, this may be because if graphene is directly added to the slurry, dispersing uniformity cannot be ensured and graphene is not in good contact with the Si-M-C composite material, so that conductivity of the Si-M-C composite material cannot be improved, cycling attenuation accelerates, and swelling increases.

The foregoing descriptions are merely preferred embodiments of this application, but are not intended to limit this application. Any modification, equivalent replacement, or improvement made without departing from the spirit and principle of this application shall fall within the protection scope of this application.

What is claimed is:

1. A composite negative electrode material, comprising:

a Si-M-C composite material and graphene on a surface of the Si-M-C composite material;

wherein M comprises at least one of boron, or nitrogen, and the Si-M-C composite material is obtained by cracking organic silicon and a carbon source at a temperature of 900-1500° C.;

solid state nuclear magnetic resonance testing of the Si-M-C composite material shows that chemical shifts of element silicon comprise −5 ppm±5 ppm, −35 ppm±5 ppm, −75 ppm±5 ppm, and −110 ppm±5 ppm; and wherein K is a peak width at half height of a peak at −5 ppm±5 ppm in the solid state nuclear magnetic resonance testing of the Si-M-C composite material, and satisfies 7 ppm<K<28 ppm.

2. The composite negative electrode material according to claim 1, wherein a mass of the graphene accounts for 1% to 20% of a mass of the composite negative electrode material.

3. The composite negative electrode material according to claim 1, wherein $D_v50$ of the Si-M-C composite material is 3.0 μm to 8.0 μm.

4. The composite negative electrode material according to claim 1, wherein $D_v50$ of the composite negative electrode material is 6.0 μm to 15.0 μm.

5. The composite negative electrode material according to claim 1, wherein a peak intensity ratio of the composite negative electrode material satisfies $0<I_{1350}/I_{1580}<1$ in Raman testing, wherein $I_{1350}$ and $I_{1580}$ are Raman intensities of peaks at 1350 $cm^{-1}$ and 1580 $cm^{-1}$ of the composite negative electrode.

6. The composite negative electrode material according to claim 1, wherein a specific surface area of the composite negative electrode material is 0.5 $m^2/g$ to 8 $m^2/g$.

7. The composite negative electrode material according to claim 1, wherein a conductivity of the composite negative electrode material is 2.0 S/cm to 30 S/cm.

8. A negative electrode plate, comprising a mixture layer, wherein the mixture layer comprises the composite negative electrode material according to claim 1.

9. The negative electrode plate according to claim 8, wherein a resistance of the mixture layer is 0.02Ω to 0.1Ω, measured by a four-probe method using four copper plates of 1.5 cm×1 cm×2 mm arranged in a line with equal spacing, with a distance of 1-2 cm between the middle two plates, pressed to the mixture layer at 3000 Kg for 60 s, and calculated as an average voltage-to-current ratio from 12 points of the layer.

10. An electronic apparatus, comprising a electrochemical apparatus, wherein the electrochemical apparatus comprises a composite negative electrode material; the composite negative electrode material comprising a Si-M-C composite material and graphene on a surface of the Si-M-C composite material; wherein M comprises at least one of boron or nitrogen, and the Si-M-C composite material is obtained by cracking organic silicon and a carbon source at a temperature of 900-1500° C.; solid state nuclear magnetic resonance testing of the Si-M-C composite material shows that chemical shifts of element silicon comprise −5 ppm±5 ppm, −35 ppm±5 ppm, −75 ppm±5 ppm, and −110 ppm±5 ppm; and wherein K is a peak width at half height of a peak at −5 ppm±5 ppm in the solid state nuclear magnetic resonance testing of the Si-M-C composite material, and satisfies 7 ppm<K<28 ppm.

11. The electronic apparatus according to claim 10, wherein a mass of the graphene accounts for 1% to 20% of a mass of the composite negative electrode material.

12. The electronic apparatus according to claim 10, wherein $D_v50$ of the Si-M-C composite material is 3.0 μm to 8.0 μm.

13. The electronic apparatus according to claim 10, wherein $D_v50$ of the composite negative electrode material is 6.0 μm to 15.0 μm.

14. The electronic apparatus according to claim 10, wherein a peak intensity ratio of the composite negative electrode material satisfies $0<I_{1350}/I_{1580}<1$ in Raman testing, wherein $I_{1350}$ and $I_{1580}$ are Raman intensities of peaks at 1350 $cm^{-1}$ and 1580 $cm^{-1}$ of the composite negative electrode.

15. The electronic apparatus according to claim 10, wherein a specific surface area of the composite negative electrode material is 0.5 $m^2/g$ to 8 $m^2/g$.

16. The electronic apparatus according to claim 10, wherein a conductivity of the composite negative electrode material is 2.0 S/cm to 30 S/cm.

* * * * *